United States Patent [19]

Nishizawa et al.

[11] Patent Number: 5,507,523
[45] Date of Patent: Apr. 16, 1996

[54] AUTOMATICALLY RELEASABLE SAFETY DEVICE USED IN MECHANICAL IGNITER FOR GAS GENERATOR

[75] Inventors: Muneo Nishizawa; Tetsuya Hamaue; Mitsuhiko Hiruta; Koji Hiramatsu, all of Shiga, Japan

[73] Assignee: Takata Corporation, Tokyo, Japan

[21] Appl. No.: 182,594

[22] Filed: Jan. 18, 1994

[30] Foreign Application Priority Data

Jan. 22, 1993 [JP] Japan ................... 5-025960

[51] Int. Cl.⁶ .................................................. B60R 22/16
[52] U.S. Cl. ......................................... 280/806; 280/807
[58] Field of Search ............................ 280/806, 734, 280/735, 807; 297/480; 180/282; 200/61.45 R, 61.53; 73/514, 493

[56] References Cited

U.S. PATENT DOCUMENTS

| | | | |
|---|---|---|---|
| 4,251,091 | 2/1981 | Weissner et al. | 280/806 |
| 4,573,706 | 3/1986 | Breed | 280/734 |
| 5,129,680 | 7/1992 | Mori | 280/806 |
| 5,143,403 | 9/1992 | Fohl | 280/806 |
| 5,149,134 | 9/1992 | Fohl | 280/806 |
| 5,163,709 | 11/1992 | Mori | 280/806 |

FOREIGN PATENT DOCUMENTS 2220128  1/1990  United Kingdom .

*Primary Examiner*—Karin L. Tyson
*Attorney, Agent, or Firm*—Brumbaugh, Graves, Donohue & Raymond

[57] ABSTRACT

A mechanical igniter for a gas generator has a weight, a latch lever and a firing pin as movable elements to fire a percussion cap attached to the gas generator in response to acceleration, and further has a restraint member and a controller therefor as a safety device for making the movable elements immovable. The controller can be activated by attaching the mechanical igniter to the vehicle body, or removing a belt stopper after the mechanical igniter has been attached to the vehicle body, or fastening a seat belt to the occupant's body. Thus, the restraint member is released when the mechanical igniter is attached to the vehicle body, or when the seat belt system is used, thereby automatically and safely releasing the safety device for the igniter.

1 Claim, 9 Drawing Sheets

AUTOMATICALLY RELEASABLE SAFETY DEVICE USED IN MECHANICAL IGNITER FOR GAS GENERATOR

BACKGROUND OF THE INVENTION

The present invention relates to a mechanical igniter for a gas generator that supplies a working gas to a pretensioner in a seat belt system or to an air bag in an air bag system. More particularly, the present invention relates to a safety device used to prevent an erroneous actuation of the mechanical igniter.

Vehicles, for example, automobiles, are often provided with a seat belt system or an air bag system or both. For a pretensioner in a seat belt system or an air bag in an air bag system, a gas generator is employed as a device for generating a driving medium for the pretensioner or the air bag. The gas generator is activated by a combination of an acceleration sensor and an igniter which is activated in response to a signal from the acceleration sensor. In general, an electric acceleration sensor and an electric igniter are used for this purpose. Therefore, the sensor requires a power supply and electrical conductors are needed to conduct firing signals from the sensor to the igniter because the sensor is located in the front part of the vehicle which is suitable for sensing acceleration, whereas the igniter is attached to the gas generator on the pretensioner or the air bag. The costs for components and the labor and time required for assembly of electrical sensors have resulted in proposals for a low cost mechanical igniter in which neither a power supply or electrical wiring is needed and a sensor itself constitutes an igniter.

One such mechanical igniter, as disclosed in U.S. Pat. No. 4,955,638, has a weight, a trigger lever and a firing pin. When a predetermined level of acceleration acts, the trigger lever is activated by inertial movement of the weight, causing the spring-loaded firing pin to perform a percussive action, thereby firing a fuse of a gas generator. The igniter has a safety device for preventing an unintentional firing. The safety device has a shutter plate constituting a restraint member which is reciprocatingly movable between a position in which it prevents the firing pin from performing a percussive action and a position where it allows a percussive action of the firing pin. The shutter plate is linked to and actuated by rotation of a set lever, which thus serves as a controller for the shutter plate.

The provisions for preventing unintended firing of the above-described mechanical igniter further include a multiple erroneous actuation preventing device including a rotary shaft that restrains the weight and the firing pin and a device that holds the seat belt by a plunger interlocked with the shutter plate. Moreover, measures are taken to prevent accidental movement of the set lever. It is therefore considered that the degree of reliability of the safety device is extremely high.

Although it is important to take all possible measures to ensure reliability of the operation of the safety device with a view to preventing an erroneous actuation of the mechanical igniter, it is even more important to ensure that the safety devices are deactivated so that the igniter can function when required. An effective way of ensuring the release of the safety device at the proper time is to automate the operation of releasing the safety device from the viewpoint of eliminating the possibility of a failure to deactivate the safety device due to human error.

SUMMARY OF THE INVENTION

The present invention has been made in view of the above-described circumstances, and it is a first object of the present invention to provide an automatically releasable safety device used in a mechanical igniter for a gas generator, which is capable of being automatically operated according to various circumstances.

It is a second object of the present invention to provide an automatically releasable safety device used in a mechanical igniter for a gas generator, which is automatically operated when the igniter is installed on the vehicle body and also when the igniter is removed.

It is a third object of the present invention to provide an automatically releasable safety device used in a mechanical igniter for a gas generator, which is automatically operated when a seat belt system is actually used after the mechanical igniter has been attached to the vehicle body.

It is a fourth object of the present invention to provide an automatically releasable safety device used in a mechanical igniter for a gas generator of a pretensioner in a seat belt system, which is automatically operated in relation to an operation of assembling the pretensioner into the vehicle body.

To attain the above-described objects, the present invention provides an automatically releasable safety device used in a mechanical igniter for a gas generator. The mechanical igniter has a weight, a latch lever and a firing pin as movable elements to fire a percussion cap attached to the gas generator in response to acceleration. The mechanical igniter further has a restraint member and a controller therefor as a safety device for making the movable elements immovable. The controller has an actuating member which is displaced on abutting against a vehicle body when the mechanical igniter is attached to the vehicle body. The actuating member may be a leaf spring which is displaced on abutting against an inner panel of the vehicle body. Alternatively, the actuating member may be a lever which is displaced on abutting against a trim cover provided on the vehicle body. Instead of the vehicle body being the element that displaces the actuating member, the element that displaces to actuating lever or other actuating device may be a mounting element used to secure the mechanical igniter to the vehicle body.

The controller may, alternatively, be a solenoid which is activated in response to a signal generated when it is detected that the seat belt of the seat belt system has been fastened to the occupant's body. When the gas generator is adapted for the pretensioner in the seat belt system, the controller may be a lever which is displaced on abutting against a mounting element used to secure the pretensioner to the vehicle body. The arrangement may also be such that the controller is a belt stopper used for temporarily preventing the seat belt of the seat belt system from being unintentionally wound, and the restraint member is connected to the belt stopper and removably attached to the safety device.

In the mechanical igniter for a gas generator according to the present invention, when the mechanical igniter is attached to the vehicle body, the actuating member of the controller is displaced on engaging the vehicle body or the mounting element, thereby releasing the movable elements of the sensor from the restraint by the restraint member and thus allowing the firing pin to perform a percussive firing action in response to acceleration. Conversely, when the mechanical igniter is removed from the vehicle body, the actuating member is released from engagement with the vehicle body or mounting member, and the movable elements of the sensor are restrained by the restraint member again. Thus, the safety device can be automatically released simply by attaching the mechanical igniter to the vehicle body in the same way as in the case of the conventional practice, without the need of special attention to the safety device. Conversely, when the mechanical igniter is to be removed from the vehicle body during dismantling of the vehicle, for example, it is also possible to automatically reset the safety device into an operative state simply by performing a dismantling operation.

On the other hand, in the arrangement wherein the controller is a solenoid which is activated in response to a signal generated when it is detected that the seat belt of the seat belt system has been fastened to the occupant's body, the solenoid is energized and deenergized in response to the operation of fastening and removing the seat belt, which is conducted by an occupant, causing the restraint member to operate in the same way as the above. In this case, since the controller, which is comprised of the solenoid, operates in response to a signal generated when it is detected that the seat belt has been fastened to the occupant's body, the safety device is automatically released when the seat belt system is actually used after the mechanical igniter has been attached to the vehicle body. Therefore, the automatic release of the safety device is made only when it is necessary to bring the mechanical igniter into an operative state. Thus, the objective of preventing unintended or accidental actuation is attained very effectively.

In an arrangement wherein the gas generator is adapted for a pretensioner of a seat belt system and the controller is a belt stopper, after the completion of assembling of the pretensioner into the vehicle body, the belt stopper, which has been temporarily preventing the seat belt from being undesirably wound, is removed. Consequently, the restraint member, which is connected to the belt stopper, comes off from the safety device, thus bringing the mechanical igniter into an operative state. This safety device is not released simply by attaching the retractor to a predetermined position on the vehicle body, but it is released when the belt stopper is removed. Therefore, the safety is further improved, and the confirmation of the release of the safety device is facilitated. Furthermore, since this safety device is removed when the retractor is mounted for actual use, it is possible to simplify the mechanical igniter and reduce the weight thereof.

In an arrangement in which the actuating member is displaced by engaging, not the vehicle body, but a mounting element used to secure the mechanical igniter to the vehicle body, an impact on the vehicle body can be transmitted directly to the mechanical igniter. Accordingly, it is possible to obtain an advantageous effect in which the mechanical igniter, which also serves as an acceleration sensor, can respond to acceleration with even more certainty, in addition to the above-described advantageous effects.

DESCRIPTION OF THE EMBODIMENTS

Figure 3:
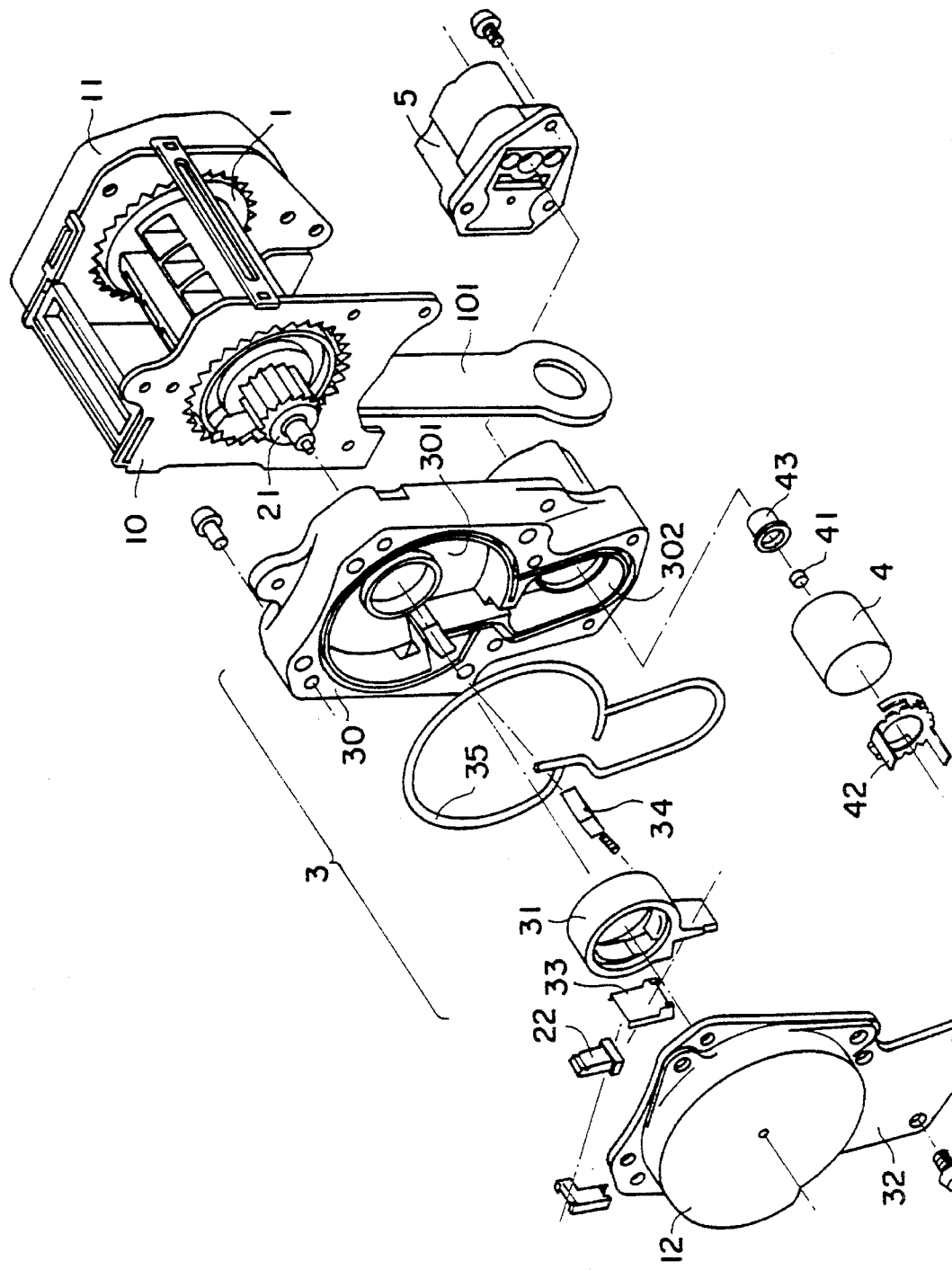
FIG. 3 is a partly exploded perspective view showing the general arrangement of a retractor with a pretensioner.

Embodiments in which the present invention is used to ignite a gas generator of a pretensioner integrated with a seat belt retractor will be described below with reference to the accompanying drawings. Prior to the description of portions related to the present invention, the general arrangement of a seat belt retractor with a pretensioner will be briefly explained. As shown in FIG. 3, the retractor has a seat belt winding device 1, a gas-pressure actuator 3 connected to the seat belt winding device 1 through a clutch mechanism, a gas generator 4 for supplying a gas to the actuator 3, and a mechanical igniter 5 activated in response to acceleration to fire a percussion cap 41 attached to the gas generator 4.

The seat belt winding device 1 has a shaft which is supported at one end by an emergency lock mechanism 11 and at the other end by a take-up spring unit 12, thereby being rotatably supported on a retractor base 10. The clutch mechanism includes a ratchet wheel 21 which is fitted to one end of the seat belt winding device 1 in such a manner that the ratchet wheel 21 is unable to rotate relative to the seat belt winding device 1. The clutch mechanism further includes a clutch key 22 which is radially movably supported by a rotary piston 31 of the gas-pressure actuator 3 so as to be engageable with the ratchet wheel 21. The gas-pressure actuator 3 includes the rotary piston 31, a cylinder block 30 rotatably accommodating the rotary piston 31, and a lid 32 which closes the open end of the cylinder block 30. The cylinder block 30 has a cylinder chamber 301 for the rotary piston 31, and a gas supply chamber 302 formed adjacent to the cylinder chamber 301, in which the gas generator 4 is disposed. The gas generator 4, which has the percussion cap 41 fitted in one end thereof, is received in the gas supply chamber 302 and retained by a snap ring 42. The mechanical igniter 5 is attached to an end of the gas supply chamber 302 on the side thereof which is remote from the lid 32. Reference numeral 101 in FIG. 3 denotes a stay extending from the retractor base 10. A seal bush 43 hermetically seals the area between the cylinder block 30 and the mechanical igniter 5. A vane seal 33 hermetically seals the area between the vane portion of the rotary piston 31 and the cylinder block 30. A ring seal 34 hermetically seals the area between the ring portion of the rotary piston 31 and the cylinder block 30. A gasket 35 hermetically seals the area between the cylinder block 30 and the lid 32.

Figure 1:
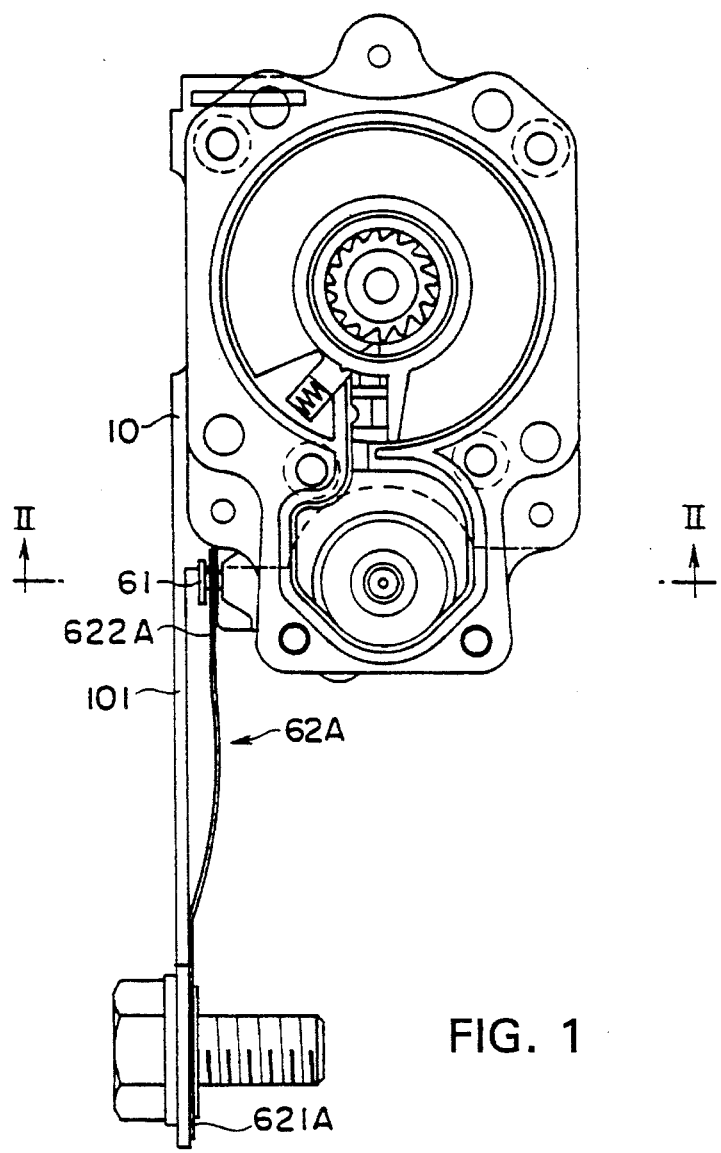
FIG. 1 is a front view showing a first embodiment in which the present invention is applied to a retractor with a pretensioner and a leaf spring is used as an actuating member.
Figure 2:
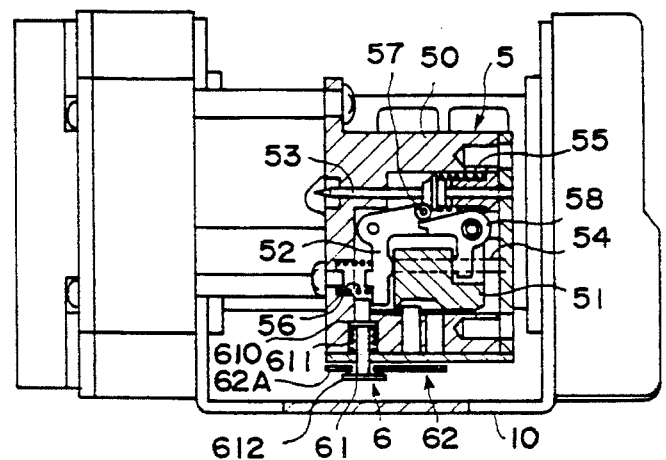
FIG. 2 is a sectional view taken along the line II—II in FIG. 1.
Figure 4:
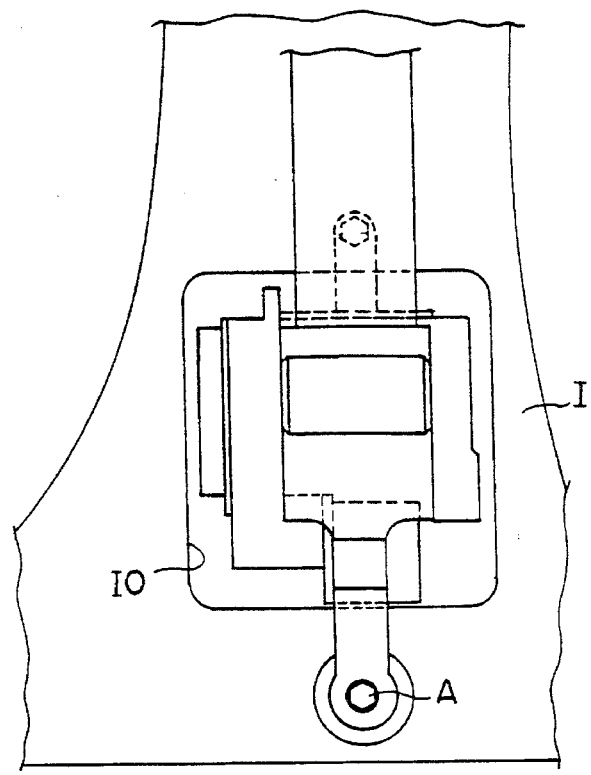
FIG. 4 is a side view showing the way in which the retractor according to the first embodiment is attached to the vehicle body.

In the thus arranged seat belt retractor with a pretensioner, the mechanical igniter 5, which is disposed to fire the percussion cap 41 attached to the gas generator 4 in response to acceleration, has an automatically releasable safety device (hereinafter referred to simply as "safety device") which is applicable in the following form according to the present invention. FIGS. 1, 2 and 4 show a first embodiment of the present invention which has practically the same arrangement as that of the above-described retractor, although the details are slightly different in configuration from those described above and shown in FIG. 3. As shown in FIG. 2, the mechanical igniter 5 has a weight 51, a latch lever 52, and a firing pin 53, which are incorporated in an igniter casing 50 as movable elements. The mechanical igniter 5 further has a safety device 6 which is comprised of a restraint member (safety pin 61) for keeping at least one of the movable elements (the latch lever 52 in this embodiment) immovable, and a controller 62 which is connected to the safety pin 61 and actuated to release the latch lever 52 from the immovable state. The controller 62 of the safety device 6 has an actuating member (leaf spring 62A) which is displaced upon engaging a vehicle body-side member (i.e., an inner panel I, described below) when the mechanical igniter 5 is attached to a vehicle body through the cylinder block 30 and the retractor base 10, and which transmits the displacement to the safety pin 61.

The weight 51 of the mechanical igniter 5 in this embodiment is movably supported on a pair of slide bars 54, each of which is supported at both ends thereof by the igniter casing 50. The firing pin 53 is spring-loaded by a firing spring 55 and movably supported at both ends thereof by the igniter casing 50. The latch lever 52 is pivotally supported by the igniter casing 50 so as to face the weight 51 and loaded with a set load by a set spring 56 to engage the firing pin 53 through a roller 57 supported by a pin. The latch lever 52 is rotated against the set load by inertial movement of the weight 51 so as to disengage from the firing pin 53, thereby allowing the firing pin 53 to perform a percussive firing action by the spring load. In the embodiment, a sub-lever 58 is provided in connection with the latch lever 52. The sub-lever 58 is rotatably disposed to face a side of the weight 51 which is opposite to the side thereof that faces the latch lever 52. Accordingly, the sub-lever 58 cooperates with the latch lever 52 to clamp the weight 51 from both sides of the direction of inertial movement of the weight 51.

In the embodiment, the safety device 6 includes a restraint member comprised of a safety pin 61, a coil return spring 611 applying a load to the safety pin 61 in a direction such as to push the pin 61 in, and a leaf spring 62A that constitutes a controller 62, as described above. The safety pin 61 has a spring seat flange 610 provided on an axially intermediate portion thereof so that the inner end of the return spring 611 abuts on the spring seat flange 610. The safety pin 61 further has a head flange 612 provided at its outer end that is engaged by the leaf spring 62A. The safety pin 61 thus arranged is inserted into a stepped pin hole formed in the igniter casing 50, and the coil return spring 611 is disposed with the inner end thereof resiliently retained by the spring seat flange 610 and with the outer end thereof resiliently retained by a casing lid. The leaf spring 62A in this embodiment is arranged, as shown in FIG. 1, with its proximal end 621A secured by a suitable device to an anchor bolt-receiving portion of a stay 101 extending from the retractor base 10, and the working end 622A, which stands off from the retractor base 10, engaged with the safety pin 61.

Figure 5:
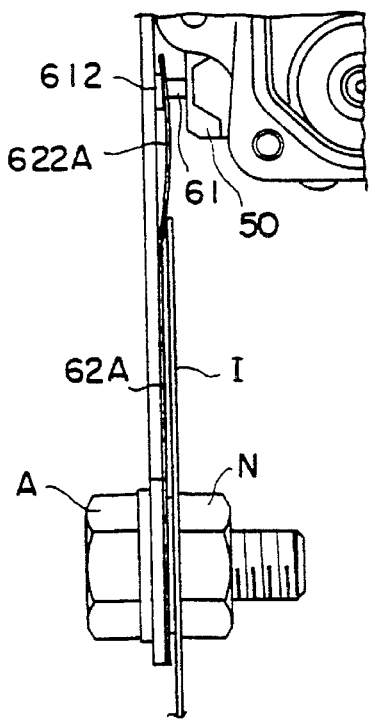
FIG. 5 is a fragmentary front view showing the operation of the leaf spring in the first embodiment.

As shown in FIG. 4, the seat belt retractor thus arranged is secured by using an anchor bolt A in an inner panel opening IO provided in an inner panel I of the vehicle body. At this time, as an inner panel-side nut N on the anchor bolt A is tightened, the safety device 6 is pressed against the inner panel I of the vehicle body. Thus, the safety device 6, which is in the state shown in FIG. 1 before being attached to the inner panel I, is flattened against the inner panel I, as shown in FIG. 5. As a result, the working end 622A of the leaf spring 62A pushes the head flange 612 of the safety pin 61 in a direction away from the sensor casing and toward the stay 101, causing the safety pin 61 to be pulled out against the load from the coil return spring 611 (see FIG. 2). Thus, the safety pin 61 is pulled out from the igniter casing 50, thereby releasing the latch lever 52 from the restraint by the distal end of the safety pin 61 (see FIG. 2).

Thus, according to the above-described first embodiment, the safety device can be automatically released simply by attaching the seat belt retractor to the vehicle body in the same way as in the case of the conventional seat belt retractor, without the need of a worker paying special attention to the safety device. Conversely, when the seat belt retractor is to be removed from the vehicle body during a repair operation of dismantling of the vehicle, for example, the safety device is automatically reset into an operative state when the retractor is removed. In this case, the disengagement of the leaf spring from the vehicle panel I releases the leaf spring 62A and restores the pin 61 to a position in which it blocks movement of the weight.

Figures 6A, 6B:
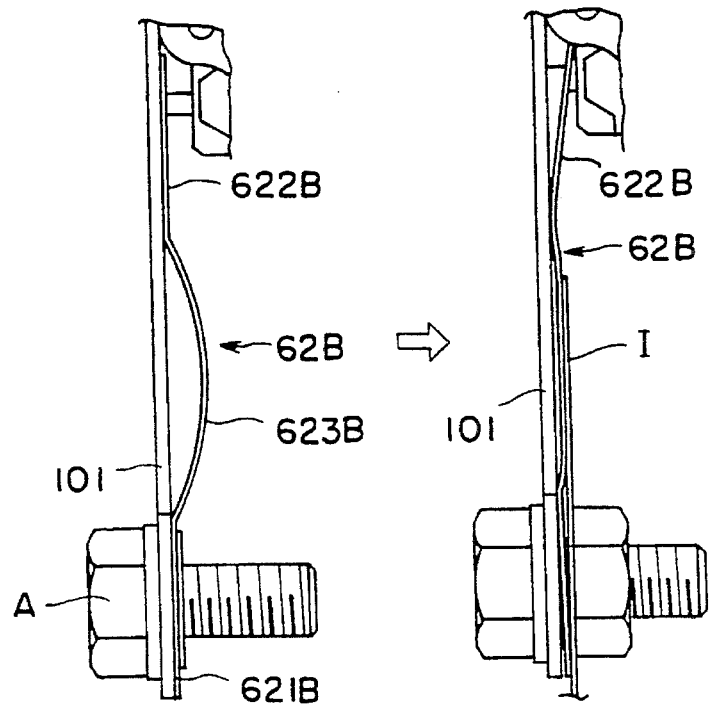
FIGS. 6A and 6B illustrate, in its two operating states, a modification in which the leaf spring in the first embodiment is adapted to operate in a direction opposite to that of the first embodiment.

The above-described embodiment has a safety device in which the restraint member is pulled out to release the safety device, and hence the above-described leaf spring has a configuration conforming to this type of safety device. Therefore, a safety device which is released by pushing in the restraint member has a leaf spring 62B formed as shown in FIG. 6. That is, the working end 622B and the proximal end 621B are flat, and an arcuate pressing portion 623B is formed in the middle of the leaf spring 62B. The leaf spring 62B is set in a state where the proximal end 621B is secured to the stay 101 by using the anchor bolt A, and the working end 622B abuts on the stay 101, facing the restraint member.

In this modification, when the seat belt retractor is attached to the inner panel I of the vehicle body, the convex side of the arcuate portion 623B abuts on the panel I and is pressed toward the stay 101. Accordingly, the working end 622B of the leaf spring 62B rotates clockwise as viewed in the figure about the boundary between the arcuate portion 623B and the working end 622B, which is supported by the stay 101. As a result, other associated elements of the controller are pushed in by the working end 622B, and eventually the restraint member is released.

Figure 7:
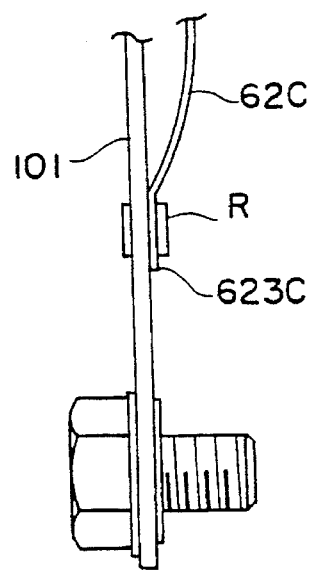
FIG. 7 is a fragmentary front view showing another modification in which the leaf spring is attached to a position different from that in the first embodiment.

FIG. 7 shows a modification applicable to a case where the stay 101 is relatively long. In this case, the leaf spring 62C has its proximal end 623 secured to an intermediate portion of the stay 101 by using a rivet R. Still another modification may be such that, although not shown, the head flange 612 of the above-described safety pin 61 is composed of a pair of adjacent flanges, and a forked working end of the leaf spring 62 is fitted to the small-diameter portion between the two flanges. With this arrangement, the safety pin 61 is capable of being displaced in either of two directions for insertion and removal as the leaf spring 62 is displaced. Accordingly, it is possible to omit the coil return spring 611 and the spring seat flange 610 of the safety pin 61 in the above-described embodiment and hence possible to simplify the arrangement.

Figure 8:
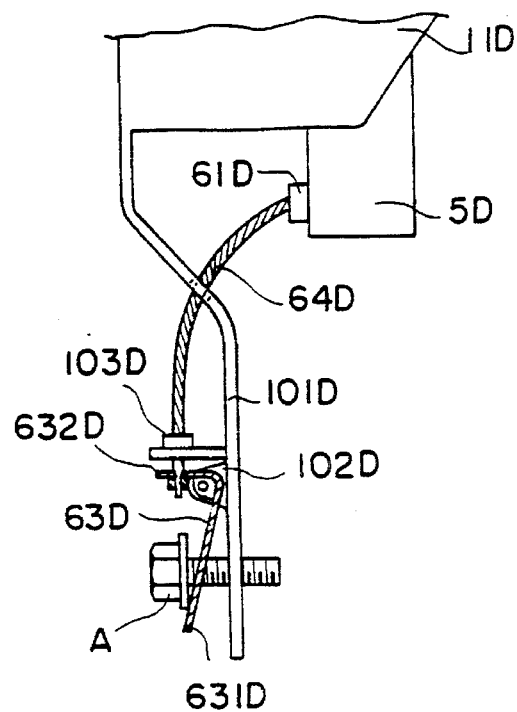
FIG. 8 is a fragmentary rear view schematically showing the arrangement of a second embodiment of the present invention in which a lever is used to constitute a controller.
Figure 9:
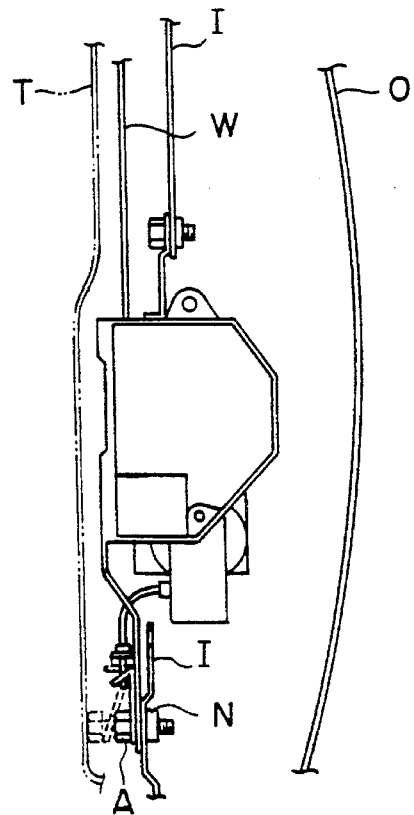
FIG. 9 is a rear view schematically showing the way in which the second embodiment is attached to the vehicle body and also showing the operation of the second embodiment.

FIGS. 8 and 9 show a second embodiment of the present invention in which the actuating member is a release lever 63D which abuts on a fixing element, that is, the anchor bolt A. In this case, the controller is composed of the release lever 63D and a control cable 64D for connecting the release lever 63D to the safety pin 61D. In this embodiment, the release lever 63D is rotatably attached to a bracket 102D raised from the stay 101D. The release lever 63D has an arm 631D at the proximal end thereof and an arm 632D at the working end thereof. The proximal arm 631D is formed with a hole for insertion of the anchor bolt A. One end of the control cable 64D is secured to the working arm 632D. A portion of the control cable 64D in the vicinity of the portion thereof which is connected to the release lever 63D is supported by a guide 103D raised from the stay 101D. The other end portion of the control cable 64D is passed through an opening in the stay 101D and connected to the safety pin 61D.

In this embodiment, as the nut N on the anchor bolt A, which is used to attach the seat belt retractor to the inner panel I, is tightened, the proximal arm 631D of the release lever 63D is pushed by the bolt head and pressed against the stay 101D. The counterclockwise (as viewed in the figure) rotation of the release lever 63D about the bracket 102D causes a pulling action of the control cable 64D, thereby pulling out the safety pin 61D to release the safety device. In FIGS. 8 and 9 reference symbol 5D denotes a mechanical igniter, 11D an emergency lock mechanism, 0 an outer panel, W a belt webbing, and T a trim cover.

Figure 10:
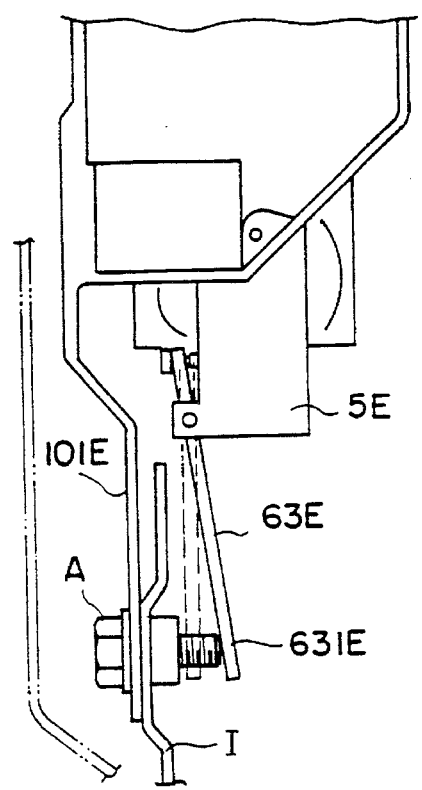
FIG. 10 is a rear view schematically showing the arrangement and operation of a modification of the second embodiment in which the lever abuts on the distal end of an anchor bolt.
Figure 11:
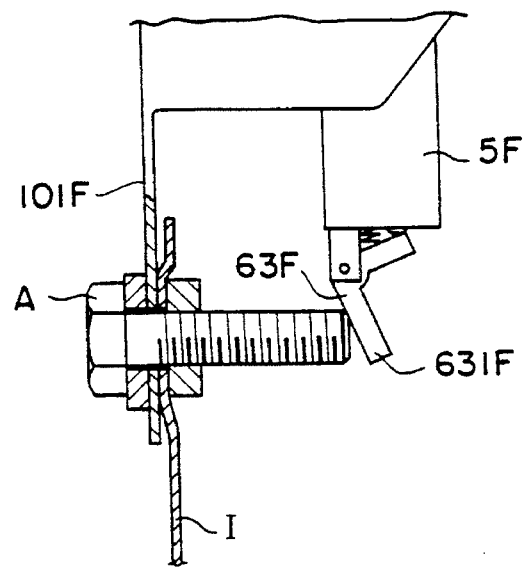
FIG. 11 is a rear view schematically showing another modification of the second embodiment in which the lever operates in the opposite direction to that in the modification shown in FIG. 10.

In a case where the above-described release lever 63D is used as an actuating member, if the release lever 63D is supported on the mechanical igniter side, it is possible to provide an arrangement in which the number of parts is further reduced by omitting the control cable 64D. In such a case, the system may be arranged such that the proximal arm 631D of the release lever 63D is pushed by the distal end of the anchor bolt A. FIG. 10 shows an embodiment in which the above-described arrangement is applied to a safety device which is released by pulling out a restraint member. FIG. 11 shows an embodiment in which the above-described arrangement is applied to a safety device which is released by pushing in a restraint member. In these embodiments (also in the following embodiments), members corresponding to those in the above-described embodiments are denoted by the same reference numerals, and these embodiments are distinguished from each other by English letters suffixed to the reference numerals.

Figure 12:
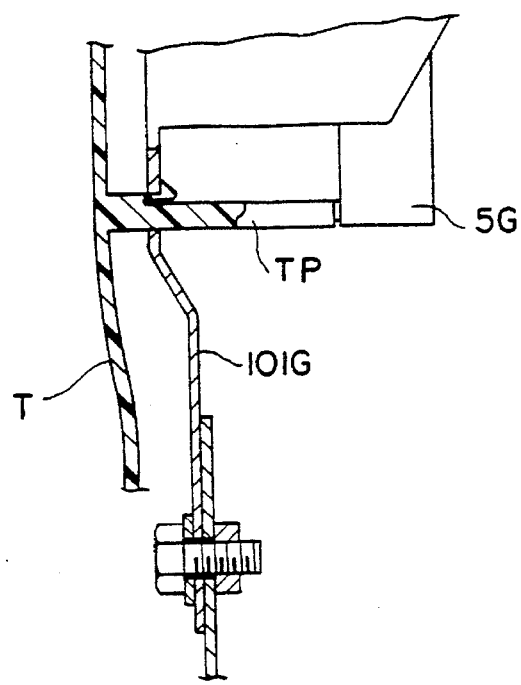
FIG. 12 is a rear view schematically showing the arrangement of a third embodiment of the present invention in which an actuating member engages a trim cover.

Although in the foregoing embodiments the safety device is made operative by attaching the retractor to the inner panel, it is also possible to employ an arrangement in which the safety device is released by attaching the trim cover T to the vehicle body after the retractor has been attached to the inner panel. FIG. 12 shows an embodiment that adopts the last-mentioned arrangement. In this embodiment, the trim cover T is formed with a projection TP. The projection TP may be fitted in a mounting hole formed in the stay 101G, thereby using the projection TP for securing the trim cover T to the vehicle body so that the trim cover T will not come off.

Figure 13:
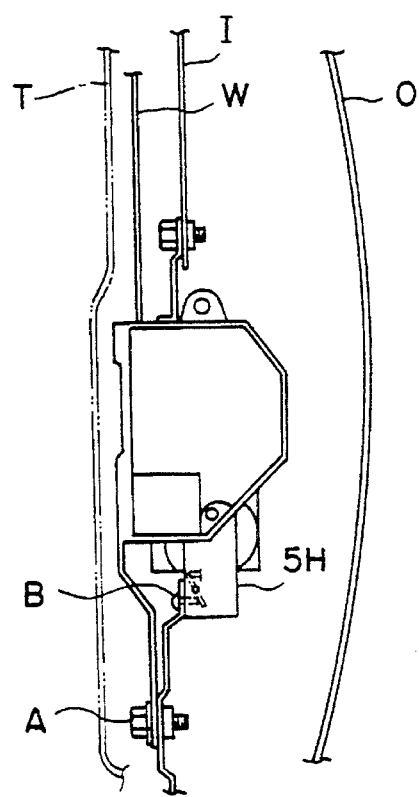
FIG. 13 is a rear view schematically showing the arrangement of a fourth embodiment of the present invention in which an actuating member engages a fixing element.
Figure 14:
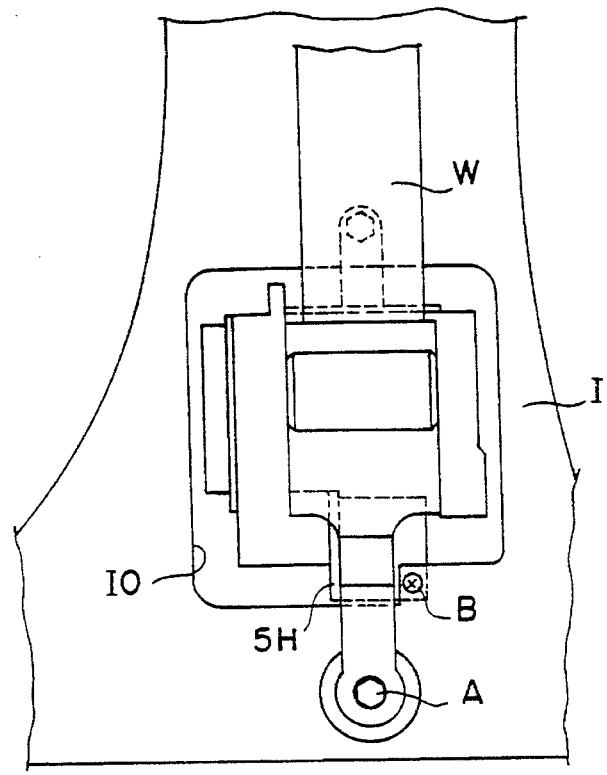
FIG. 14 is a front view schematically showing the arrangement of the fourth embodiment.

FIGS. 13 and 14 show a fourth embodiment of the present invention which is arranged such that the safety device is released by tightening a fixing screw B used to secure the mechanical igniter 5H to the vehicle body. In this embodiment, a fixing screw B for securing the mechanical igniter to the vehicle body is provided separately from the anchor bolt A used to attach the seat belt retractor to the vehicle body, and the safety device is released by tightening the fixing screw B. With this arrangement, it is also possible to obtain the secondary advantageous effect that an impact on the vehicle body can be transmitted directly to the mechanical igniter 5H without using the seat belt retractor as an intermediary for force transmission.

Figure 15:
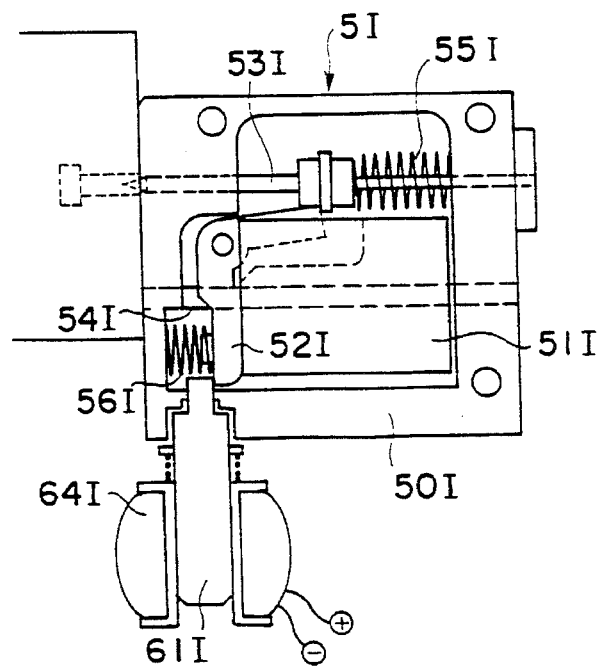
FIG. 15 is a sectional view schematically showing the arrangement of a fifth embodiment of the present invention in which a solenoid is used to constitute a controller.

FIG. 15 shows a fifth embodiment of the present invention in which a solenoid SL of a safety device is activated in response to an electric signal from a buckle switch (not shown) of the seat belt system. In this embodiment, a plunger 61I of the solenoid SL is pushed or pulled by energizing or deenergizing a solenoid coil 64I, thereby releasing the safety device. The solenoid SL is activated in response to an electric signal from the buckle device of the seat belt system.

Figure 16:
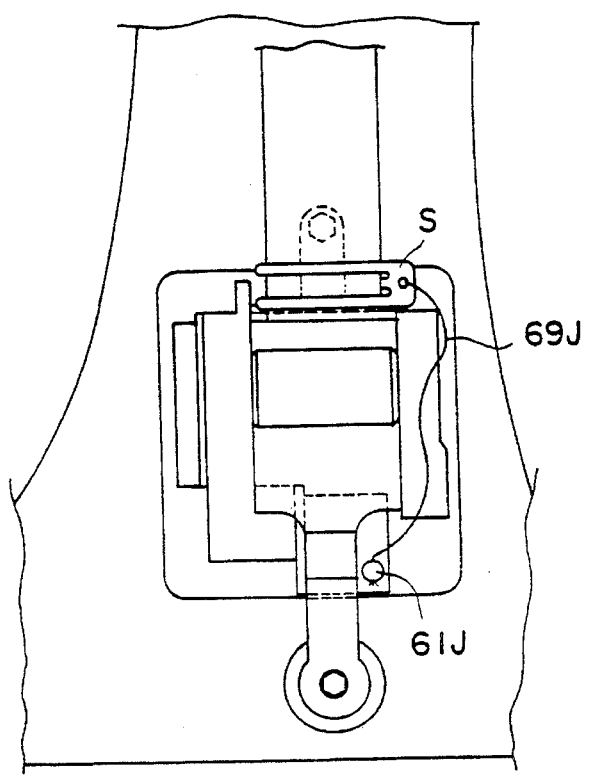
FIG. 16 is a front view schematically showing the arrangement of a sixth embodiment of the present invention in which a belt stopper is used to constitute a controller.
Figure 17:
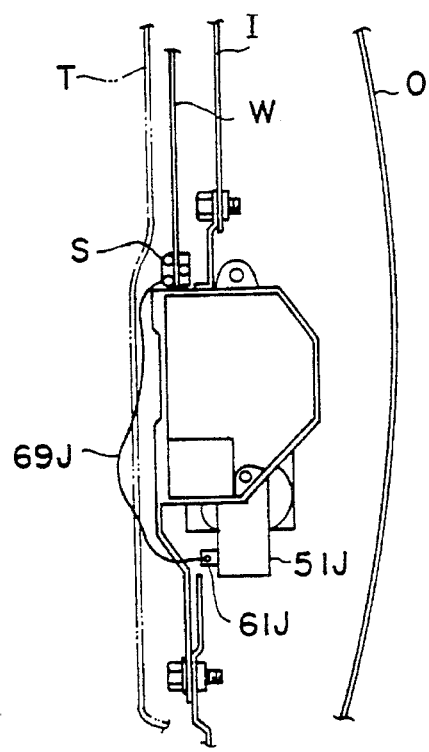
FIG. 17 is a rear view schematically showing the arrangement of the sixth embodiment.

FIGS. 16 and 17 show a sixth embodiment of the present invention in which a release device is formed by connecting together a belt stopper S, which is used as an auxiliary member when the seat belt system is attached to the vehicle body, and a release pin 61J of the safety device. The belt stopper S and the release pin 61J of the safety device may be connected together by various methods, including integration of the two members into one unit. In this embodiment, the belt stopper S and the release pin 61J are connected by a cord 69J, so that when the belt stopper S is removed, the release pin 61J of the safety device is also naturally removed. Thus, the safety device is released.

With the above-described arrangement of FIGS. 16 and 17, the safety device is not released simply by attaching the retractor to a predetermined position on the vehicle body, but it is released by removing the belt stopper S. Accordingly, the safety is further improved, and confirmation of the release of the safety device is facilitated.

Although the present invention has been detailed above by way of each embodiment in which the present invention is applied to a pretensioner in a seat belt system, it should be noted here that the present invention is not necessarily limited to the described embodiments and that it is also applicable, for example, to an inflator in an air bag system without changing the basic arrangement thereof. Further, various changes and modifications may be made in the specific arrangement without departing from the scope of the invention, which is set forth in the appended claims.

We claim:

1. In a mechanical igniter for a gas generator, said mechanical igniter having a weight, a latch lever and a firing pin as movable elements to fire a percussion cap attached to said gas generator in response to acceleration, said mechanical igniter further having restraint means and control means therefor as a safety device for making said movable elements immovable, the improvement comprising an automatically releasable safety device wherein said control means includes a leaf spring which is displaced on abutting against a vehicle body when said mechanical igniter is attached to said vehicle body, the leaf spring has a first end affixed to a mounting member on which the mechanical igniter is supported, a second end engaging the restraint means, and an intermediate portion between the first and second ends, the intermediate portion being configured such as to bias the second end to a first position in which the movable elements are held immovable when the mounting member is not attached to the vehicle body and such as to be engaged by the vehicle body when the mounting member is attached to the vehicle body and deformed upon such engagement against the bias such that the second end is moved to a second position in which the movable elements are released for movement.

* * * * *